United States Patent
Heck et al.

(10) Patent No.: US 7,393,062 B1
(45) Date of Patent: Jul. 1, 2008

(54) VEHICLE WHEEL COVER RETENTION SYSTEM AND METHOD FOR PRODUCING SAME

(75) Inventors: Thomas E. Heck, Monroe, MI (US); Michael Cuevas, Rockwood, MI (US); Douglas P. Mason, Livonia, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 247 days.

(21) Appl. No.: 11/086,255

(22) Filed: Mar. 22, 2005

Related U.S. Application Data

(60) Provisional application No. 60/557,641, filed on Mar. 30, 2004.

(51) Int. Cl.
*B60B 7/06* (2006.01)
(52) U.S. Cl. .................... 301/37.35; 301/37.11
(58) Field of Classification Search ............ 301/37.101, 301/37.102, 37.31, 37.11, 37.35, 37.36
See application file for complete search history.

(56) References Cited

U.S. PATENT DOCUMENTS

| | | | | |
|---|---|---|---|---|
| 3,669,501 A | * | 6/1972 | Derleth | 301/37.42 |
| 5,031,966 A | * | 7/1991 | Oakey | 301/37.11 |
| 5,188,429 A | | 2/1993 | Heck et al. | |
| 5,340,418 A | | 8/1994 | Wei | |
| 5,360,261 A | | 11/1994 | Archibald et al. | |
| 5,368,370 A | * | 11/1994 | Beam | 301/37.36 |
| 5,421,642 A | | 6/1995 | Archibald | |
| 5,490,342 A | * | 2/1996 | Rutterman et al. | 301/37.36 |
| 5,533,261 A | | 7/1996 | Kemmerer | |
| 5,597,213 A | * | 1/1997 | Chase | 301/37.43 |
| 6,152,538 A | * | 11/2000 | Ferriss et al. | 301/37.33 |
| 6,637,832 B2 | * | 10/2003 | Wrase et al. | 301/37.31 |
| 6,663,189 B2 | * | 12/2003 | Enomoto et al. | 301/37.36 |

\* cited by examiner

*Primary Examiner*—Jason R Bellinger
(74) *Attorney, Agent, or Firm*—MacMillan, Sobanski & Todd, LLC

(57) ABSTRACT

This invention relates to a vehicle wheel cover retention system for securing a wheel cover to a vehicle wheel using an adhesive. According to one feature of the invention, the wheel cover has a portion which extends to a backside of a window, the portion having a lip formed thereon which is received in a cut provided on the backside of the window in order to retain the wheel cover in place on the wheel for a time sufficient to enable the adhesive to cure in order to permanently secure the wheel cover to the wheel. According to another feature of the invention, the wheel cover has an inner surface and an outer surface, the inner surface provided with a lip formed thereon which is received in a groove formed in an outboard face of the wheel in order to retain the wheel cover in place on the wheel for a time sufficient to enable the adhesive to cure in order to permanently secure the wheel cover to the wheel. According to yet another feature of the invention, the wheel cover has portion which covers a portion of a spoke of the wheel, the portion provided with at least one end which is provided with a lip which is received behind a rear surface of the spoke in order to retain the wheel cover in place on the wheel for a time sufficient to enable the adhesive to cure in order to permanently secure the wheel cover to the wheel.

15 Claims, 4 Drawing Sheets

VEHICLE WHEEL COVER RETENTION SYSTEM AND METHOD FOR PRODUCING SAME

CROSS-REFERENCE TO RELATED APPLICATIONS

This application claims the benefit of U.S. Provisional Application Ser. No. 60/557,641, filed Mar. 30, 2004.

BACKGROUND OF THE INVENTION

This invention relates in general to vehicle wheels and, in particular, to an improved vehicle wheel cover retention system and method for producing the same.

Full or partial vehicle wheel covers of the removable type are well known and have been used for many years to enhance the styling of conventional, stamped wheel discs. Also, it is known to permanently secure a full or partial wheel cover to a vehicle wheel using an adhesive.

One example of a vehicle wheel construction wherein an ornamental plastic wheel cover having a chrome-plated outer surface is permanently secured to an outboard facing surface of a wheel is disclosed in U.S. Pat. No. 3,669,501 to Derleth. In the Derleth patent, the wheel cover includes an outer peripheral flange which overhangs the outboard tire bead seat retaining flange of the wheel, an inner peripheral flange which seats against an outboard surface of a hub sleeve, and an intermediate portion which is spaced outwardly from the face of the wheel. An expanding adhesive material is applied to the outboard surfaces of the wheel. When the adhesive material is expanded, it is operative to fill the void between the wheel and the wheel cover to permanently secure the wheel cover to the outboard face of the wheel.

Another example of a vehicle wheel construction having an ornamental wheel cover permanently secured to an outboard facing surface of the wheel is disclosed in U.S. Pat. No. 5,031,966 to Oakey. In the Oakey patent, a cast aluminum wheel cover is secured to a disc of a steel wheel using a high density structural adhesive.

SUMMARY OF THE INVENTION

This invention relates to an improved vehicle wheel cover retention system and method for producing the same wherein a wheel cover is secured to a vehicle wheel using an adhesive. According to one feature of the invention, the wheel cover has a portion which extends to a backside of a window, the portion having a lip formed thereon which is received in a cut provided on the backside of the window in order to retain the wheel cover in place on the wheel for a time sufficient to enable the adhesive to cure in order to permanently secure the wheel cover to the wheel. According to another feature of the invention, the wheel cover has an inner surface and an outer surface, the inner surface provided with a lip formed thereon which is received in a groove formed in an outboard face of the wheel in order to retain the wheel cover in place on the wheel for a time sufficient to enable the adhesive to cure in order to permanently secure the wheel cover to the wheel. According to yet another feature of the invention, the wheel cover has portion which covers a portion of a spoke of the wheel, the portion provided with at least one end which is provided with a lip which is received behind a rear surface of the spoke in order to retain the wheel cover in place on the wheel for a time sufficient to enable the adhesive to cure in order to permanently secure the wheel cover to the wheel.

The method for securing the wheel cover to the vehicle wheel comprising the steps of: (a) providing a wheel including at least one of: (1) at least one window formed in an outboard face thereof having at least one cut provided on a backside thereof; (2) at least one spoke formed in an outboard surface thereof having a rear surface; and (3) a groove formed in an outboard face thereof; (b) providing a wheel cover having at least one of: (1) a portion which extends to the backside of the at least one window having a lip formed thereon; (2) an inner surface and an outer surface, the inner surface provided with a lip thereon; and (3) a portion which covers at least a portion of the at least one spoke of the wheel provided with at least one end having a lip; and (c) retaining the wheel cover on the wheel by at least one of the following methods: (1) the portion having the lip formed thereon being received in the at least one cut provided on the backside of the at least one window; (2) the inner surface provided with the lip formed thereon being received in the groove formed in the outboard face of the wheel; and (3) the portion having the lip formed thereon being received behind the rear surface of the at least one spoke; and (d) securing the wheel cover to the wheel with an adhesive, wherein the retaining method recited above in the step (c) retains the wheel cover in place on the wheel for a time sufficient to enable the adhesive to cure in order to permanently secure the wheel cover to the wheel.

Other advantages of this invention will become apparent to those skilled in the art from the following detailed description of the preferred embodiments, when read in light of the accompanying drawings.

DESCRIPTION OF THE PREFERRED EMBODIMENTS

Figure 1:
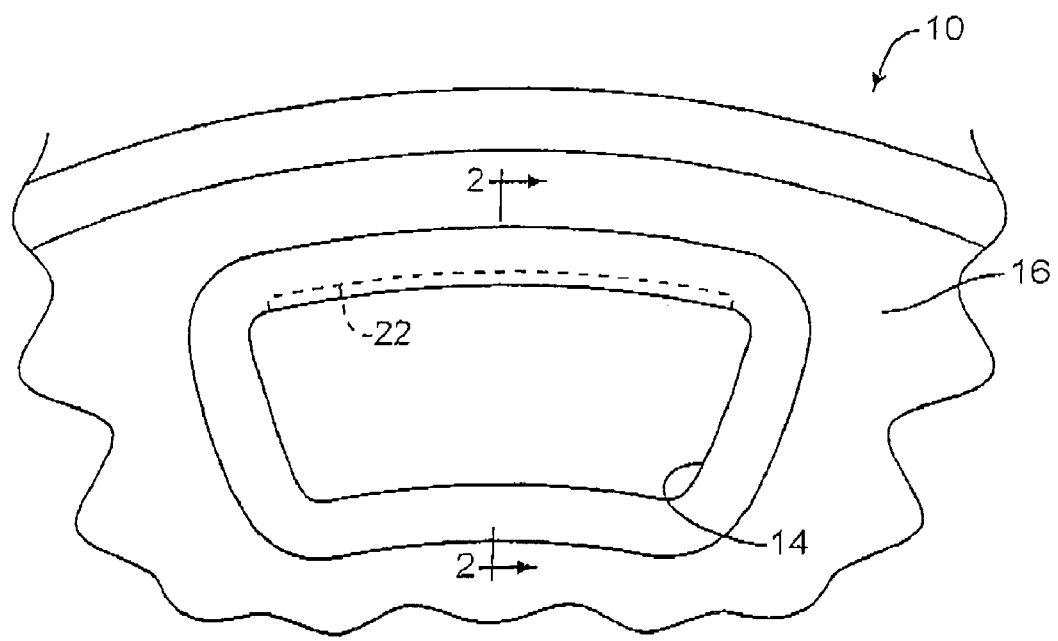
FIG. 1 is a view of a portion of a vehicle wheel including a first embodiment of a wheel cover retention system in accordance with the present invention.
Figure 2:
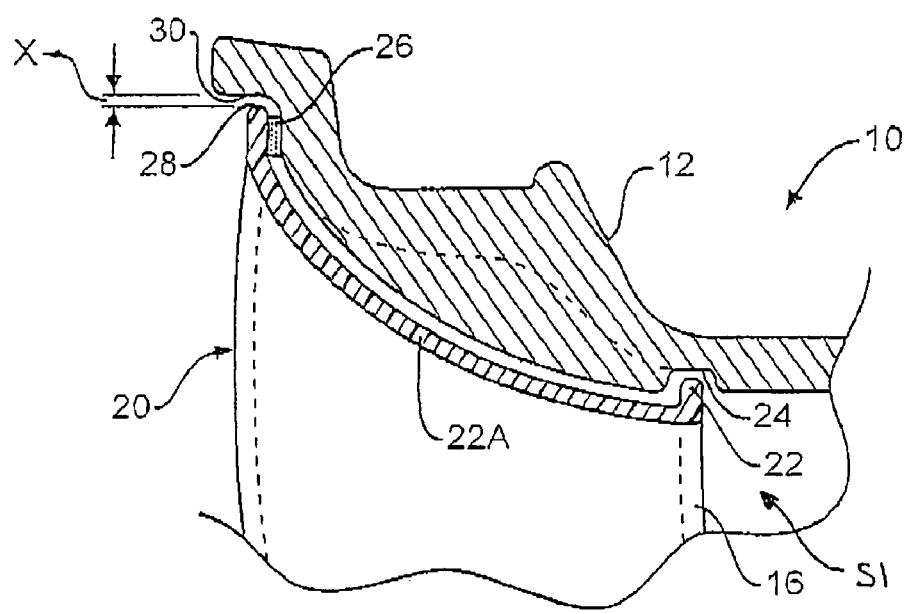
FIG. 2 is a sectional view taken along line 2-2 of FIG. 1.
Figure 3:
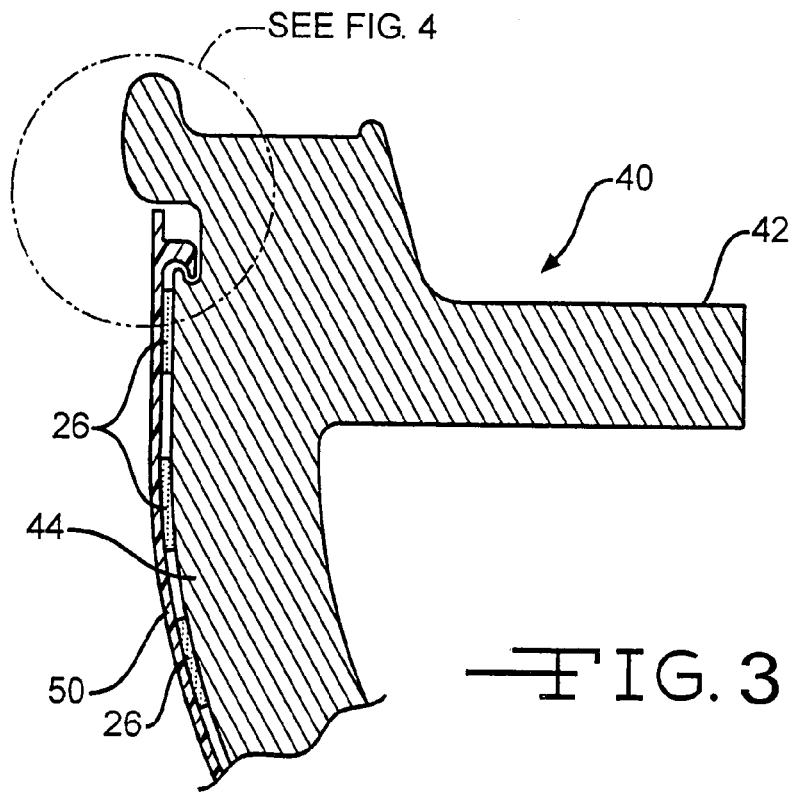
FIG. 3 is a view of a portion of a vehicle wheel including a second embodiment of a wheel cover retention system in accordance with the present invention.
Figure 4:
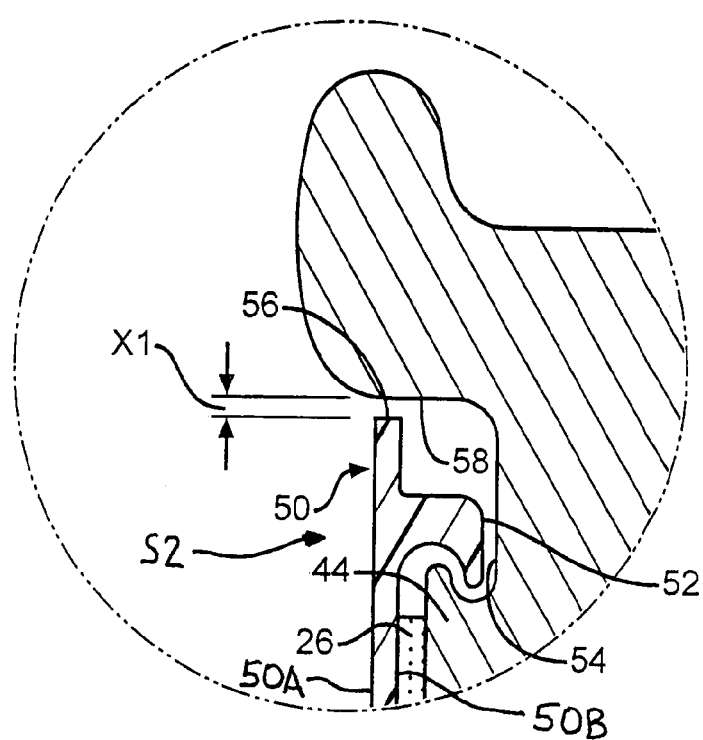
FIG. 4 is an enlarged view of a portion of the wheel shown in FIG. 3.

Referring now to the drawings, there is illustrated in FIGS. 1 and 2 a portion of a vehicle wheel, indicated generally at 10, including a first embodiment of a wheel cover retention system, indicated generally at S1, in accordance with the present invention. The vehicle wheel 10 can be of any suitable type of material or materials, such as for example, steel, aluminum and alloys thereof, and can be of any suitable type of wheel construction, such as for example, a "full face" type of wheel, such as shown in FIG. 5A of U.S. Pat. No. 5,533,261 to Kemmerer, a "bead seat attached" wheel such as shown in FIG. 4 of U.S. Pat. No. 5,188,429 to Heck et al., a "well attached" wheel such as shown in FIG. 3 of U.S. Pat. No. 5,188,429 to Heck et al., a "bimetal" wheel construction including an aluminum disc and a steel rim such as shown in U.S. Pat. No. 5,421,642 to Wei et al., a "modular wheel"

construction such as shown in U.S. Pat. No. 5,360,261 to Archibald et al., or a cast aluminum wheel such as shown in U.S. Pat. No. 5,340,418 to Wei, the disclosures of all of these patents incorporated by reference in entirety herein.

As shown in FIGS. 1 and 2, in the illustrated embodiment the vehicle wheel 10 is preferably formed from aluminum and includes a rim portion 12 and at least one window or opening 14 formed in an outboard face or disc portion 16 thereof. According to the first embodiment of the wheel cover retention system S1, a wheel cover 20 is provided having a lip or protuberance 22 on a portion 22A thereof which is adapted to engage or be received in a deflash cut or groove 24 provided on a backside or rear surface of the window 14. Preferably, the wheel cover 20 is provided with a lip 22 at each of the windows 14 of the wheel 10 to provide a uniform appearance. The particular shape and/or location of the window 14, the lip 22 and/or the cut 24 can be other than illustrated if so desired. Alternatively, the cut 24 can be formed by other methods. For example, if the rim portion 12 of the wheel is formed from steel or aluminum, the cut 24 can be formed by other suitable processes for such materials, such as for example by grinding, cutting, machining, rolling and stamping during the forming of the rim portion itself or subsequent to the rim forming process.

The lip 22 can be a single continuous lip which extends along the entire length of the upper portion of the window 14 or can be a single continuous lip or a plurality of individual lips which extend along a portion of the length of the upper portion of the window 14. In the illustrated embodiment, the cut 24 is provided along the entire upper portion of the window 24. However, the cut 24 could extend only along a portion of the upper portion of the window 14 depending upon the configuration of the associated lip 22. Also, in addition to the cut 24 being along only the upper portion of the window 14 or in addition to or in place thereof, other portions of the window 14 could have a cut provided on a backside of the window 14 and the wheel cover 20 could have a portion or portions with an associated lip or lips provided thereon which are adapted to engage such cut or cuts.

As a result of the lip 22 of the wheel cover 20 engaging the cut 24 of the window 14, the wheel cover 20 is located and retained on the wheel 10 in a mechanical lock-like manner for a time sufficient to enable an adhesive 26 to cure in order to permanently secure the wheel cover 20 to the wheel 10. The adhesive 26 can be of any suitable type, such as for example, a silicone or urethane adhesive and a foam-in-place adhesive, and can be selectively applied in predetermined manner and/or amount so as to completely fill the space between the adjacent surfaces of the cover 20 and the wheel 10 or to only fill selective areas or regions between the adjacent surfaces, if so desired.

Preferably, the wheel cover 20 is formed from a plastic material and the lip 22 is integrally molded with the cover 20. Alternatively, the wheel cover 20 can be formed from other suitable materials, such as for example, steel, and/or the wheel cover 20 can be comprised of more than one piece if so desired. In both instances, the wheel cover 20 is preferably chrome plated to provide a chrome like appearance or can be painted or otherwise adorned.

In the illustrated embodiment, the wheel cover 20 is spaced apart from the outboard surface 16 of the wheel 10. Alternatively, the wheel cover 20 could be a generally close-fitting type of cover and generally follow the contour of the outboard surface 16 of the wheel 10 or could have portions which are spaced apart from the outboard surface 16 of the wheel and portions which generally follow the contour of the outboard surface 16 of the wheel. Also, the portion 22A having the lip 22 can be formed separate from the wheel cover 20 and secured thereto by suitable means depending upon the particular material from which the wheel cover 20 is formed.

Also, as shown in FIG. 2, the wheel cover 20 includes an outer peripheral edge 28 which is preferably spaced apart from contact with an associated surface 30 of the wheel 10 a distance X for noise, tolerance, and/or assembly reasons. Alternatively, the wheel cover 20 can have any desired shape and the outer peripheral edge 28 thereof can be other than illustrated if so desired.

Referring now to FIGS. 3 and 4 and using like reference numbers to indicate corresponding parts, there is illustrated a portion of a vehicle wheel, indicated generally at 40, including a second embodiment of a wheel cover retention system, indicated generally at S2, in accordance with the present invention. As shown therein, in the illustrated embodiment the wheel 40 is preferably a full cast aluminum wheel and includes a rim portion 42 and an outboard face or disc portion 44. Alternatively, the wheel 40 can be formed from other suitable materials and/or can be of other suitable types, if so desired.

According to the second embodiment of the wheel cover retention system S2, a wheel cover 50 is provided having an outer surface 50A and an inner surface 50B which includes a lip or protuberance 52 thereon which is adapted to engage or be received in an annular groove 54 formed in the outboard face 44 of the wheel 40. The particular shape of the lip 52 and/or the groove 54 can be other than illustrated if so desired. Also, the groove 54 is preferably formed by a machining operation subsequent to the casting process of the aluminum rim portion 42 and is a continuous groove. Alternatively, the groove 54 can be formed by other methods. For example, if the rim portion 42 of the wheel 40 is formed from steel or even aluminum, the groove 54 can be formed by a suitable process, such as by machining, rolling, stamping or casting during the forming of the rim portion itself or subsequent to the rim forming process.

The lip 52 can be a continuous lip which extends around the entire periphery of the cover 50 or can be one or more interrupted lips 52 which are provided at predetermined positions on the cover 50. As a result of the lip 52 engaging the groove 54, the wheel cover 50 is located and retained on the wheel 40 in a mechanical lock-like manner for a time sufficient to enable an adhesive 26 to cure in order to permanently secure the wheel cover 50 to the wheel 40. The adhesive 26 can be of any suitable type, such as for example, a silicone or urethane adhesive and a foam-in-place adhesive, and can be selectively applied in predetermined manner and/or amount so as to completely fill the space between the adjacent surfaces of the cover 50 and the wheel 40 or to only fill selective areas or regions between the adjacent surfaces, if so desired.

Preferably, the wheel cover 50 is formed from a plastic material and the lip 52 is integrally molded with the cover 50. Alternatively, the wheel cover 50 can be formed from other suitable materials, such as for example, steel, and/or the wheel cover 50 can be comprised of more than one piece if so desired. In both instances, the wheel cover 50 is preferably chrome plated to provide a chrome like appearance or can be painted or otherwise adorned. Also, as shown in FIG. 4, an outer peripheral edge 56 of the wheel cover 50 is preferably spaced apart from contact with an associated surface 58 of the wheel 40 a distance X1 for noise, tolerance, and/or assembly reasons. Alternatively, the wheel cover 40 can have any desired shape and the outer peripheral edge 56 thereof can be other than illustrated if so desired.

Figure 5:
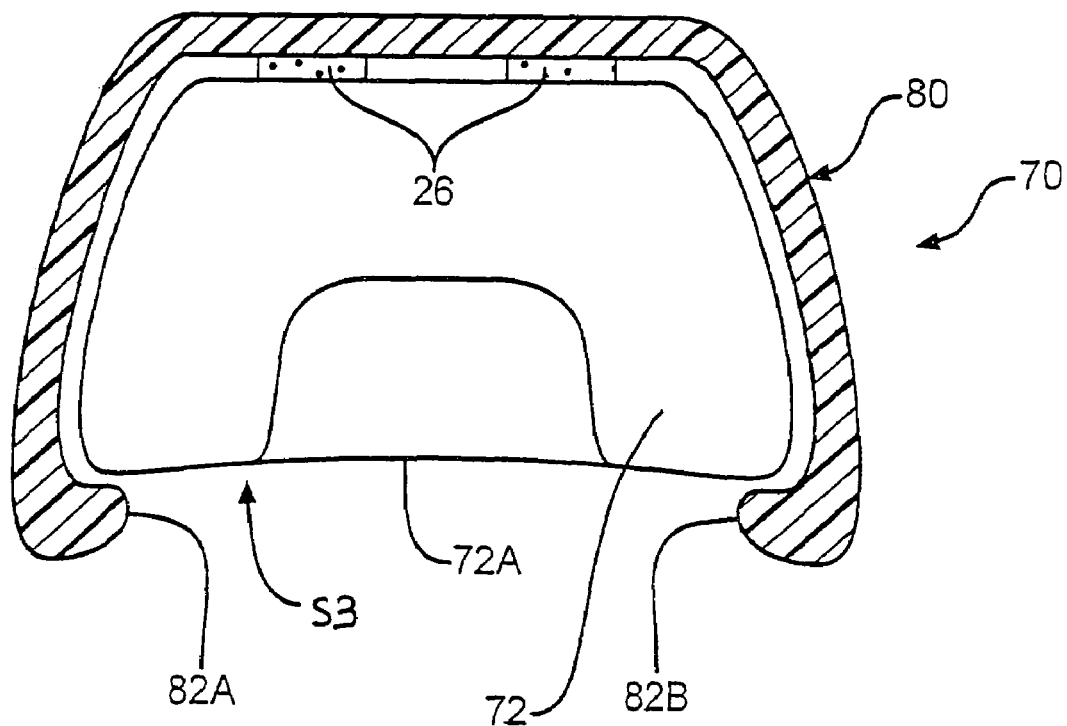
FIG. 5 is a view of a portion of a vehicle wheel including a third embodiment of a wheel cover retention system in accordance with the present invention.

Referring now to FIG. 5 and using like reference numbers to indicate corresponding parts, there is illustrated a portion of a vehicle wheel, indicated generally at 70, including a third embodiment of a wheel cover retention system, indicated generally at S3, in accordance with the present invention. As shown therein, the wheel 70 can be of any suitable material and type and includes at least one spoke portion 72. According to the third embodiment of the wheel cover retention system S3, a wheel cover 80 is preferably provided with a pair of lips or protuberances 82A and 82B on opposed remote end portions thereof which are adapted to engage or be received behind an associated back or rear surface 72A of the spoke 72. The particular shape of the spoke 72, the rear surface 72A and/or one or both of the lips 82A and 82B can be other than illustrated if so desired. The wheel cover 80 can cover the entire outer surface of the spoke 72 or can only cover selected portions of the spoke 72 if so desired.

The lips 82A and 82B can continuous lips which run or extend the entire length of the spoke 72 or can be one or more lips 82A and 82B which run or extend less than the entire length of the spoke 72. The lips 82A and 82B are provided on the cover 80 at least at one spoke 72 of the wheel 70 but can be provided on the cover 80 at more than one or at all of the spokes 72 of the wheel. Also, only one of the lips 82A and 82B could be provided on the cover 80 if so desired. As a result of the lips 82A and 82B engaging the surface 72A of the spokes 72, the wheel cover 80 is located and retained on the wheel 70 in a mechanical lock like manner for a time sufficient to enable an adhesive 26 to cure in order to permanently secure the wheel cover 80 to the wheel 70.

Preferably, the wheel cover 80 is formed from a plastic material and the lips 82A and 82B are integrally molded with the cover 80. Alternatively, the wheel cover 80 can be formed from other materials, such as for example, steel. In both instances, the wheel cover 80 is preferably chrome plated to provide a chrome like appearance or can be painted or otherwise adorned. The adhesive 26 can be of any suitable type, such as for example, a silicone or urethane adhesive and a foam-in-place adhesive, and can be selectively applied in predetermined manner and/or amount so as to completely fill the space between the adjacent surfaces of the cover 50 and the spoke 72 of the wheel 70 or to only fill selective areas or regions between the adjacent surfaces, if so desired.

Figure 6:
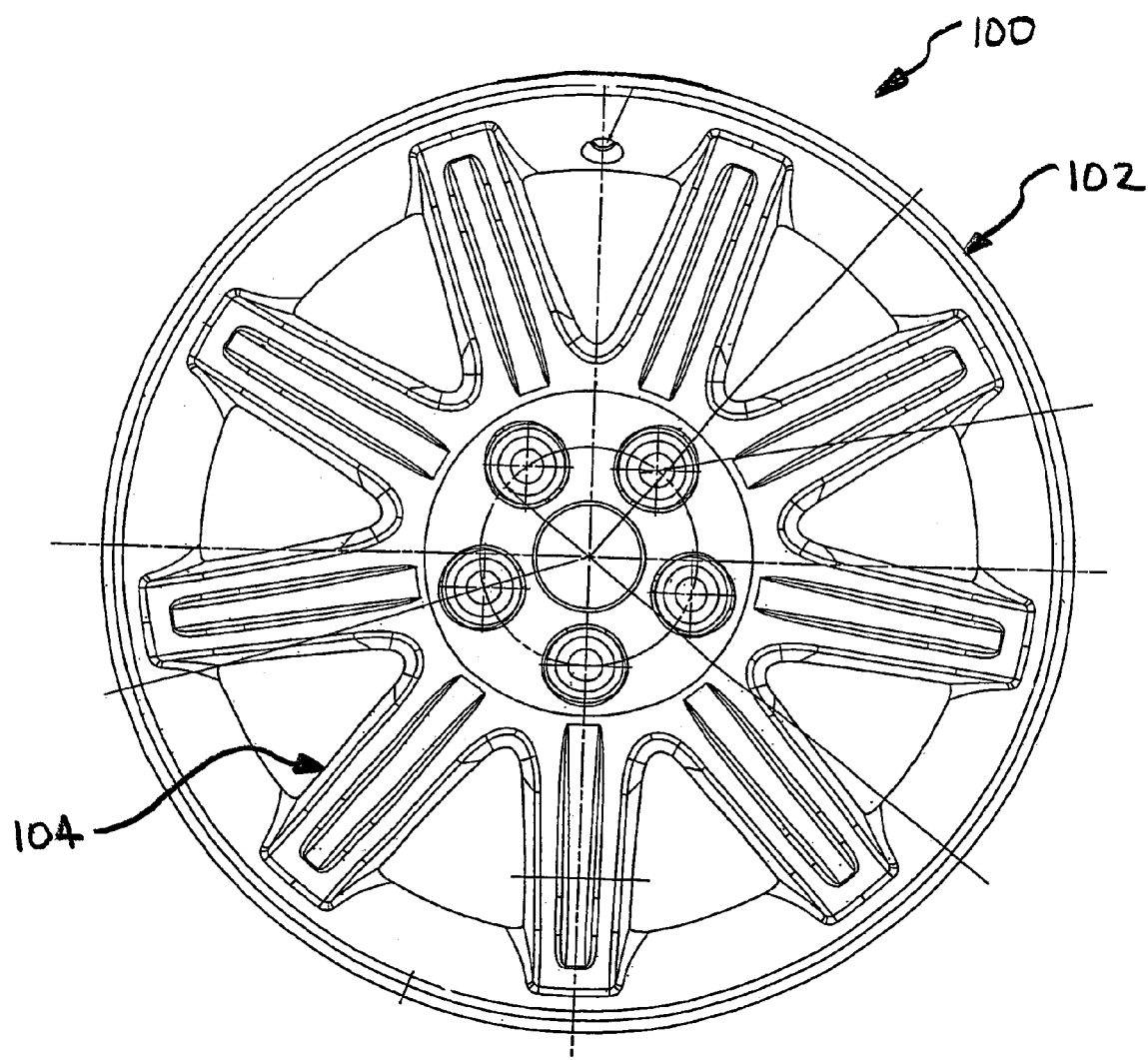
FIG. 6 is a plan view of a vehicle wheel which is adapted to include at least one of the three embodiments of the wheel cover retention systems in accordance with the present invention.

Referring now to FIG. 6, there is illustrated a plan view of a vehicle wheel, indicated generally at 100, which is adapted to include at least one of the three embodiments of the wheel cover retention systems S1, S2 and S3 in accordance with the present invention. As shown therein, the wheel 100 includes a wheel 102 having a wheel cover 104 secured thereon. In particular, in order to retain the wheel cover 104 on the wheel 102 for a time sufficient for a suitable adhesive to cure in order to permanently secure the wheel cover 104 to the wheel 102, at least one (or more) of the first embodiment of the wheel cover retention system S1 discussed above and illustrated in FIGS. 1 and 2, the second embodiment of the wheel cover retention system S2 discussed above and illustrated in FIGS. 4 and 5, and the third embodiment of the wheel cover retention system S3 discussed above and illustrated in FIG. 5 is utilized.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A vehicle wheel comprising:
  a wheel including at least one window formed in an outboard face thereof, said at least one window extending completely through said outboard face of said wheel so as to make a rim portion of said wheel capable of being seen when viewed through said at least one window, said at least one window being provided in said outboard face near an outer periphery thereof and extending radially inwardly, said at least one window having at least one cut provided on a backside thereof; and
  a wheel cover secured to the wheel by an adhesive, said wheel cover having a portion which extends to said backside of said at least one window, said portion having a lip formed thereon which is received in said at least one cut provided on said backside of said at least one window in order to retain said wheel cover in place on said wheel for a time sufficient to enable said adhesive to cure in order to permanently secure said wheel cover to said wheel.

2. The vehicle wheel of claim 1 wherein said at least one cut is provided on an upper portion of said backside of said at least one window.

3. The vehicle wheel of claim 1 wherein said wheel includes a plurality of windows and each of said windows includes at least one cut provided on a backside thereof and said wheel cover has a plurality of portions each of which includes a lip formed thereon which is received in said at least one cut provided on said backside of said each of said windows.

4. The vehicle wheel of claim 1 wherein said wheel cover further includes an outer peripheral edge which is spaced apart radially from contact with an associated surface of said wheel.

5. The vehicle wheel of claim 1 wherein said wheel cover is formed from plastic and has an outer surface which is chrome plated or painted.

6. The vehicle wheel of claim 1 wherein said lip is a single continuous lip.

7. The vehicle wheel of claim 1 wherein said lip is formed integral with said wheel cover.

8. A method for securing a wheel cover to a vehicle wheel comprising the steps of:
  (a) providing a wheel including at least one window formed in an outboard face thereof having at least one cut provided on a backside thereof, the at least one window extending completely through the outboard face of the wheel so as to make a rim portion of the wheel capable of being seen when viewed through the at least one window, the at least one window being provided in the outboard face near an outer periphery thereof and extending radially inwardly;
  (b) providing a wheel cover having a portion which extends to the backside of the at least one window having a lip formed thereon;
  (c) retaining the wheel cover on the wheel by the portion having the lip formed thereon being received in the at least one cut provided on the backside of the at least one window; and
  (d) securing the wheel cover to the wheel with an adhesive, wherein the retaining method recited above in the step (c) retains the wheel cover in place on the wheel for a time sufficient to enable the adhesive to cure in order to permanently secure the wheel cover to the wheel.

9. The vehicle wheel of claim 1 wherein said at least one cut is provided on an upper portion of said backside of said at least one window adjacent said rim portion of said wheel.

10. The method of claim 8 wherein the at least one cut is provided on an upper portion of the backside of the at least one window.

11. The method of claim 8 wherein the wheel includes a plurality of windows and each of the windows includes at least one cut provided on a backside thereof and the wheel cover has a plurality of portions each of which includes a lip formed thereon which is received in the at least one cut provided on the backside of each of the windows.

12. The method of claim 8 wherein the wheel cover further includes an outer peripheral edge which is spaced apart radially from contact with an associated surface of the wheel.

13. The method of claim 8 wherein the wheel cover is formed from plastic and has an outer surface which is chrome plated or painted.

14. The method of claim 8 wherein the lip is a single continuous lip.

15. The method of claim 8 wherein the lip is formed integral with the wheel cover.

* * * * *